Patented June 19, 1928.

1,674,179

UNITED STATES PATENT OFFICE.

LOUIS RUDEMAN, OF THE HAGUE, NETHERLANDS.

PROCESS FOR THE MANUFACTURE OF FUEL BRIQUETTES.

No Drawing. Application filed April 30, 1927. Serial No. 188,057.

The invention relates to a process for the manufacture of fuel briquettes from water containing, vegetable fibrous material.

In order to obtain fuel briquettes from water containing, vegetable fibrous material, it is necessary to remove the water as much as possible. It has been proposed heretofore to remove the water from those fibrous material such as e. g. peat by pressing, heating etc.; however it has been found that those methods are too expensive for being successfully carried into practice; for this reason all those attempts have failed.

According to the invention the water is removed from the fibrous material in an effective and very economical way and briquettes are obtained which fully meet the requirements. In applying the invention the proportion of water of those substances is first reduced, then the pre-dried substances are treated in the heat with unthickened waste sulphite lye and finally the mass is formed into briquettes by means of a binding material and pressure by preliminarily pressing the mass and keeping the briquettes under pressure during a short time in the final pressing operation. It is observed that in some cases the pre-drying of the fibrous material can be omitted. Instead of using unthickened waste sulphite lye this substance can be applied together with other substances also containing phenols such as e. g. carbolineum, oleineum (a tar product of the trade containing the same phenols as carbolineum, but in a less amount) or the fibrous material can be exclusively treated with the substances last mentioned.

By preliminary pressing the mass and keeping the briquettes under pressure in the final pressing operation the advantage is gained that the briquettes are firm and strong and that a lustre is obtained resembling that of anthracite.

If as a fibrous material peat is used, the process can be carried out as follows:

By means of a dredger the peat is dredged and the proportion of water, being about 85–95%, reduced till about 60–65% e. g. by pressing or subjecting same to the air. The partially dried peat is then ground in a mill to a very fine degree. To the ground mass 10% of waste sulphite lye with 1% of carbolineum or 1% of oleineum are added, after which the mass is treated in a mixer. After being mixed the mass is carried to a press with superheater. This superheater is provided with a stirrer by which the mass at a temperature of about 100° C. is still mixed during 5–7 minutes, after which the mass is formed into briquettes by means of 3% hard coal tar pitch by preliminary pressing followed by a final pressing operation carried out under a pressure of 100–400 atm. During the final pressing operation the briquettes are kept under pressure during a short time. Instead of coal tar pitch, another binding material such as sulphite-pitch, wood tar pitch, brown coal tar pitch, peat tar pitch or a mixture of those substances can be used. The heating power of the thus obtained briquettes (6000 calories) almost corresponds with same of coal.

If as a fibrous material bagasse (residue of the sugar-cane industry) is used, containing about 47% of water, it is not necessary to pre-dry this material before treating same in the heat with substances containing phenols.

In order to increase the heating power, carbonaceous material such as coal dust, saw dust, coke dust may be added in any stage of the treatment.

I claim:

1. A process for the manufacture of fuel briquettes from water containing fibrous vegetable material which comprises, intimately mixing such material containing not more than 65% of water with a substance containing phenols, and forming the mixture into briquettes by subjecting it, while at a temperature of substantially 100° C., to a preliminary pressure and to a sustained final pressure.

2. A process for the manufacture of fuel briquettes from water containing fibrous vegetable material which comprises, intimately mixing such material containing not more than 65% of water with a substance containing phenols, agitating the mixture at a temperature of substantially 100° C. and forming the mixture into briquettes by subjecting it first to a preliminary pressure and then to a sustained final pressure.

3. A process for the manufacture of fuel briquettes from water containing fibrous vegetable material which comprises, intimately mixing such material containing not more than 65% of water with a substance containing phenols, agitating the mixture at a temperature of substantially 100° C., adding a binding material, and forming the resulting mixture into briquettes by subjecting it to a preliminary pressure and thereafter to a sustained final pressure of from 100–400 atmospheres.

4. A process for the manufacture of fuel briquettes from bagasse which comprises intimately mixing the bagasse with a substance containing phenols, agitating the mixture at a temperature of substantially 100°, adding a binding material, and forming the resulting material into briquettes.

5. A process for the manufacture of fuel briquettes from water containing fibrous vegetable material which comprises, intimately mixing such material containing not more than 65% of water with a substance containing phenols, adding carbonaceous material, and forming the mixture into briquettes by subjecting it, while at a temperature of substantially 100° C., to a preliminary pressure and thereafter to a sustained final pressure.

6. A process for the manufacture of fuel briquettes from water containing fibrous vegetable material containing not more than 65% of water with unthickened waste sulphite lye, agitating the mixture at a temperature of substantially 100° C., and forming the material into briquettes by subjecting it to a preliminary pressure and thereafter to a sustained final pressure.

7. A process for the manufacture of fuel briquettes from water containing fibrous vegetable material which comprises, intimately mixing such material containing not more than 65% of water with unthickened waste sulphite lye, together with other substances containing phenols, agitating the mixture at a temperature of substantially 100° C., and forming the material into briquettes by subjecting it to a preliminary pressure and thereafter to a sustained final pressure.

8. In a process as set forth in claim 1 the use of bagasse as a water containing fibrous vegetable material.

In testimony whereof I have signed my name to this specification.

LOUIS RUDEMAN.